(12) United States Patent
Yoakim et al.

(10) Patent No.: US 8,978,545 B2
(45) Date of Patent: Mar. 17, 2015

(54) APPARATUS AND METHOD FOR PREPARING A BEVERAGE BY CENTRIFUGATION

(75) Inventors: Alfred Yoakim, St. Legier la Chiesaz (CH); Jean-Paul Denisart, La Conversion (CH); Antoine Ryser, Lausanne (CH); Alexandre Perentes, Lausanne (CH); Christian Jarisch, Lutry (CH)

(73) Assignee: Nestec S.A., Vevey (CH)

( * ) Notice: Subject to any disclaimer, the term of this patent is extended or adjusted under 35 U.S.C. 154(b) by 193 days.

(21) Appl. No.: 12/919,130

(22) PCT Filed: Dec. 3, 2008

(86) PCT No.: PCT/EP2008/066666
§ 371 (c)(1),
(2), (4) Date: Aug. 24, 2010

(87) PCT Pub. No.: WO2009/106175
PCT Pub. Date: Sep. 3, 2009

(65) Prior Publication Data
US 2011/0003046 A1 Jan. 6, 2011

(30) Foreign Application Priority Data

Feb. 29, 2008 (EP) .................................... 08102147
Feb. 29, 2008 (EP) .................................... 08102148

(51) Int. Cl.
*A47J 31/22* (2006.01)
(52) U.S. Cl.
CPC ...................................... *A47J 31/22* (2013.01)

USPC ........................................ 99/302 C; 99/289 R
(58) Field of Classification Search
CPC ........ A47J 31/22; A47J 31/24; A47J 31/3623
See application file for complete search history.

(56) References Cited

U.S. PATENT DOCUMENTS

| 2,930,249 | A | * | 3/1960 | London et al. | 74/470 |
| 4,545,296 | A | | 10/1985 | Ben-Shmuel | 99/289 P |
| 5,265,517 | A | * | 11/1993 | Gilbert | 99/280 |
| 5,566,605 | A | | 10/1996 | Lebrun et al. | 99/302 C |
| 2006/0258522 | A1 | * | 11/2006 | Cornay et al. | 494/31 |

(Continued)

FOREIGN PATENT DOCUMENTS

| CN | 1761604 A | 4/2006 |
| CN | 1878492 A | 12/2006 |
| DE | 35 29 204 A1 | 2/1987 |

(Continued)

OTHER PUBLICATIONS

International Search Report and Written Opinion, PCT/EP2008/066666, mailed Mar. 20, 2009.

*Primary Examiner* — Lien T Tran
*Assistant Examiner* — Hong T Yoo
(74) *Attorney, Agent, or Firm* — Winston & Strawn LLP (57) ABSTRACT

An apparatus for preparing a beverage liquid from beverage forming ingredients contained in a receptacle by passing water through the ingredients by centrifuging the receptacle. The apparatus includes a centrifugal driver for driving the receptacle around its central axis of rotation (I), a device for feeding water into the receptacle, a filter placed in the receptacle, and at least one beverage flow outlet of variable cross-section for enabling the beverage to flow out of the receptacle.

21 Claims, 8 Drawing Sheets

(56) References Cited

U.S. PATENT DOCUMENTS

2007/0137493 A1* 6/2007 Van Der Meer et al. ........ 99/279
2008/0282899 A1   11/2008 Ranzoni

FOREIGN PATENT DOCUMENTS

| EP | 1440913 | A1 | 7/2004 |
| JP | 5913237 | U | 1/1984 |
| JP | 06339431 | A2 | 12/1994 |
| WO | WO 2006/112691 | A1 | 10/2006 |
| WO | WO2007/042415 | A1 | 4/2007 |

* cited by examiner

APPARATUS AND METHOD FOR PREPARING A BEVERAGE BY CENTRIFUGATION

This application is a 371 filing of International Patent Application PCT/EP2008/066666 filed Dec. 3, 2008.

BACKGROUND

The present invention relates to an apparatus for preparing a liquid food such as a coffee beverage by effect of centrifugation. The invention also relates to a method for the preparation of a liquid food such as coffee beverage using centrifugal forces.

It is known to prepare beverages wherein a mixture consisting of brewed coffee and coffee powder is separated with centrifugal forces. Such a mixture is obtained by bringing hot water and coffee powder together for a defined time. The water is then forced through a screen, on which screen powder material, e.g., ground coffee, is present.

U.S. Pat. No. 4,545,296 relates to a centrifugal coffee brewing apparatus using a filter cartridge inserted in an apparatus which comprises a compartment for receiving said cartridge and has a second compartment or, alternatively, a restriction orifice for providing a back pressure sufficient to control the dwell time of liquid in the cartridge. As a result, the extraction can be improved since the interaction time between the beverage ingredients and water can be significantly increased.

WO2006/112691 relates to a device and method for preparing a coffee wherein small outlets are placed downstream of a cylindrical filtering screen placed in an openable receptacle. However, the size of the beverage outlets is fixed.

The extraction conditions of the existing prior art device cannot be properly controlled. In particular, the residence time for providing the desired extraction characteristics (i.e., solid content, yield) to the beverage and/or the amount of foam created on top of the beverage cannot be easily controllable.

The present invention aims at proposing a solution to the disadvantages of the prior art.

SUMMARY OF THE INVENTION

An object of the invention is to propose an apparatus and method for preparing a beverage wherein the extraction conditions are better controlled, in particular, the residence time of liquid with the beverage ingredients can be significantly increased and eventually varied according to the needs. In particular, the taste of the beverage, e.g., coffee, can be significantly changed depending on the residence time of water in the receptacle containing the beverage ingredients.

Another object of the invention is to propose an apparatus and method for providing a beverage wherein the crema or foam on top of the beverage can be improved and eventually its amount can be controlled according to the desire of the consumer and/or the type of beverage dispensed.

For this, the invention relates to an apparatus for preparing a food liquid from a food substance contained in a receptacle by passing water through the substance by centrifugation of the receptacle comprising:

centrifugation means for driving the receptacle around its central axis of rotation,
means for feeding water in the receptacle,
filtering means placed in the receptacle and,
wherein it is provided with at least one beverage flow outlet of variable cross-section forming a flowpath restriction for the beverage leaving the receptacle.

In a mode of the invention, the at least one flow outlet comprises an openable flow restriction valve.

In one possible mode of the invention, the cross section of the at least one beverage flow outlet varies, e.g., the valve is opened, to create a flow path during centrifugation.

In a more particular embodiment, the at least one outlet for the beverage flow has a cross section which increases during the centrifugation.

In a different advantageous embodiment, the outlet cross section is varied before centrifugation. In particular, the outlet can be varied to adjust to specific characteristics of the ingredients placed in the receptacle. In particular, the outlet cross section is varied to adjust to the mean particle size and/or the mass of coffee ingredients. For example, the outlet cross section can be increased before centrifugation to compensate for a slower flow rate due to smaller mean particle sizes and/or a larger coffee mass.

In a particular mode, a valve is provided which opens as a result of the centrifugation forces, i.e., when a sufficient pressure of the centrifuged liquid is exerted on it.

As a result, a retarded release of liquid can be successfully created at the beverage outlet enabling an increase of the pressure in the receptacle and, therefore, an increase of the residence time between the beverage ingredients and water in the receptacle. The extraction properties can be greatly improved thereby resulting in the production of a coffee beverage with elevated coffee concentrations and yields.

The valve can be either active or passive.

A passive valve may be preferred to avoid an unnecessary complexity of the apparatus which can auto-regulate according to the pressure of centrifugation of the centrifuged liquid.

Accordingly, in a passive mode of the valve, the at least one beverage outlet increases as a result of the centrifugal forces such as by means of a valve which blocks the beverage flow until it opens when a predetermined load applied onto the valve is overcome by the centrifuged liquid applying sufficient centrifugal forces on the valve.

Therefore, contrary to the prior art apparatuses, the size of the cross section of the outlet(s) can vary in a dynamic manner, i.e., in response to the centrifugation of the liquid. As a result, it can be created a retarded effect on the release of the beverage which provides higher beverage concentrations, and yields, and also a better foam or coffee crema.

Preferably, the flow rate is set up by varying the rotational speed. In particular, the higher the rotational speed, the larger the cross section of the outlet(s) or the larger the flow path opening of the valve. Therefore, it is possible to shorten the delivery time of the liquid extract by setting a higher rotational speed of the receptacle. In that respect, means for controlling the rotational speed are preferably provided in the apparatus of the invention. The speed control means can comprise suitable programs stored in the control unit of the apparatus and/or comprise a speed control button providing different rotational speeds actuatable by the user.

According to a different embodiment, the flow path can be closed when the receptacle is not centrifuged by the valve and can be opened as a result of the centrifugal forces. As aforementioned, the release of the centrifuged liquid is delayed until the valve opens. The interaction between the beverage ingredients and water can so be greatly improved.

The valve can be partially opened, thus forming smaller outlets, when no or a not sufficient centrifugal pressure is exerted on the valve and can further expand in opening, thus forming larger outlet(s), as a result of the centrifugal pressure exerted by the liquid on the valve. For instance, a slow flow rate of the liquid can be desired at the start of the centrifugation process and the flow rate can increase during centrifugation when the pressure in the receptacle increases.

In an alternative mode, the valve can be active, i.e., in the sense that it can be operated by an actuating means to open a flow path or enlarge the beverage outlet(s) during centrifugation. In particular, the valve can be associated to a control unit which is configured to operate the valve in opening of the flow path and/or in enlargement of the cross section of the outlet(s) during centrifugation, e.g., after a certain volume of water has interacted with the beverage ingredients in the receptacle. For instance, the valve is operated to open when a certain threshold of pressure has been attained at the valve by the centrifuged liquid and/or when the centrifugal driving means have attained a predetermined centrifugal speed. As a result, the release of the beverage is also retarded accordingly and this promotes the interaction between the beverage ingredients and water in the receptacle.

In a possible mode, one single outlet can be provided such as a laminar annular outlet which width is variable.

Alternatively several beverage outlets can be provided at the periphery of the rotary receptacle. They can distribute along the periphery of the receptacle, e.g., at its upper edge, so to form several jets of centrifuged liquid impacting on a peripheral impact surface surrounding the receptacle. The outlets can have an individual cross section which remains substantially small for short, i.e., ristretto, espresso or lungo coffee. For instance, each outlet has a maximal cross section of less than 2.0 $mm^2$, preferably, less than 1.0 $mm^2$. Each outlet can be of a larger cross section for filter-type coffee such as Americano coffee than for short-type coffee such as espresso or ristretto. In this case, the maximal cross section of each outlet should be up to about 5.0 $mm^2$.

In another possible mode, the valve opens from a closed position to an open position by forming an annular gap capable of delivering a 360-degree centrifuged layer of beverage. In particular, the deflecting gap as determined by a valve can be closed before centrifugation and opens as the centrifugal forces of liquid increases on the valve means. The deflecting gap (i.e., its annular height) can be of less than 2.0 mm, more preferably of less than 1.0 mm, even most preferably of less than 0.5 mm. With such dimensions, the liquid is projected as a very thin layer with high velocity on the impact surface of the apparatus. This will result in forming a high amount of coffee crema. Of course, the deflecting gap can be maximized for beverages which do not require foam or a quicker release with a lower interaction time with water such as for frothless lightly brewed coffee. For instance, the gap can be as large as 2-5 mm.

In a general manner, the overall cross section of the beverage flow outlet(s) can be varied within a range comprised between substantially 0.01 $mm^2$ and 25 $mm^2$, more preferably 0.05 and 10 $mm^2$. The smaller the cross-section the longer the residence time of the liquid in the receptacle so the longer the interaction between liquid and the food ingredients, e.g., ground coffee. The smaller cross-sections also create higher pressure release of the liquid and higher velocity of the centrifuged jet thereby promoting in general a more unctuous crema. For coffee beverages, the strength of coffee and crema properties can be better controlled.

In a preferred mode of the valve, a spring-loading member is provided. The spring-loading member can, for instance, be a resilient plastic, rubber elastic or a mechanical spring. The spring-loading member acts in closure onto the gate of the valve in order to provide a predetermined load. This predetermined load must be overcome by the liquid being centrifuged out of the receptacle in order to open a flow path or enlarge the flow cross section of said outlet(s). The load can be calibrated at different values according to the type of apparatus, or the type of beverage to be produced, and/or the load can be adjustable. For this, load adjustable means can be provided to vary the load of the valve. This load adjustable means can be mechanical means such as obtained by a screw-type mechanism, or hydraulic, or electrical or be any possible combinations of these means.

In a preferred mode of the invention, the filtering means comprises a portion of filter which is placed in the rotary receptacle. The portion of filter separates the receptacle in an upstream volume onto which the beverage ingredients are placed and a downstream volume for collecting the centrifuged liquid before the liquid is released to the outlet(s). In a possible mode, the filter could also be placed adjacent the outlet(s) and the collecting volume be eliminated.

The filter is preferably a portion of screen comprising a woven material, a non-woven material, a metallic mesh, a porous plastic wall, filter paper and combinations thereof. The screen can comprise a rigid frame onto which is affixed a flexible porous material. For instance, the rigid frame is in plastic and the flexible porous material is metallic mesh.

For instance, the screen can have different peripheral shapes such as a tubular cylinder, a tubular cone, a hollow portion of sphere, a hollow pyramid, and combinations thereof.

In a preferred embodiment, the filter has a cylindrical tubular shape so that the used ingredients can be removed by scraping the surface of the filter with a disc-shaped scraper moving axially inside the filtering cylinder.

The filter can be placed in a receptacle comprising a conically widening peripheral sidewall in the direction of flow of the water downstream of the filter.

In general, the filter is positioned in the receptacle at distance of the sidewall so to leave a collecting volume between the filter and the outlet. Hence, the filtering function is separated from the flow restriction function for providing cleaner operations since the outlet(s) are maintained clean and non-contaminated by solid particles contained in the receptacle.

The apparatus of the invention can further comprise means for opening the receptacle and a scraper for removing the used ingredients from the receptacle. The scraper can be a moveable disc-shaped element placed in the receptacle. The scraper is thus moved axially along the central axis of rotation of the receptacle to scrape the inside surface of the filter and so remove the used powder after beverage brewing. The receptacle can comprise an opening bottom wall to make possible the removal of the dried ingredients in a cleanable and convenient manner. As a result, the device can be kept continuously clean in a simple manner and manual maintenance can be considerably reduced.

The apparatus can further comprise a water introduction pipe placed above the receptacle. The water introduction pipe can be placed along the centre of rotation or be offset with respect to this axis. Also, the apparatus further comprises an ingredient inlet, e.g., ground coffee inlet above the receptacle. The inlet can be in communication with a chute and a screw conveyor for the ingredients. A milling device can be associated to the present apparatus, in particular, to feed the conveyor with milled ingredients, e.g., ground coffee.

In a possible alternative, the receptacle can be designed to receive portioned packages such as filter pods/cartridges. The advantage is that the dosing of the beverage is easier and the apparatus does not require any fastidious cleaning.

After brewing, the used pod/cartridge is simply removed from the receptacle and a new pod/cartridge is inserted in.

The filter pod/cartridge could be provided with a, preferably peripheral, filter portion to filter the liquid coming out of the pod/cartridge and maintain solids in the pod/cartridge.

The filter pod/cartridge could have preferably a cylindrical shape.

The filter pod/cartridge could have preferably a torus shape.

The enclosure of the filter pod/cartridge can be made of filter paper, plastic, aluminum and combinations thereof. The enclosure can contain a dose of coffee or other beverage ingredients.

The invention further relates to a method for the preparation of a beverage by applying a beverage ingredients to a filter in a receptacle, rotating the receptacle and supplying water in the receptacle so that water is forced through the beverage ingredients and beverage liquid is extracted through said filter, characterized in that downstream of said filter the flow of beverage is passed through a flow outlet which cross section is variable.

The method of the invention further comprises the operation of setting the rotational speed of the receptacle amongst different rotational speeds.

BRIEF DESCRIPTION OF THE DRAWINGS

The invention will now be explained in more detail below with reference to various, non-limiting embodiments.

DETAILED DESCRIPTION OF THE INVENTION

Figure 1:
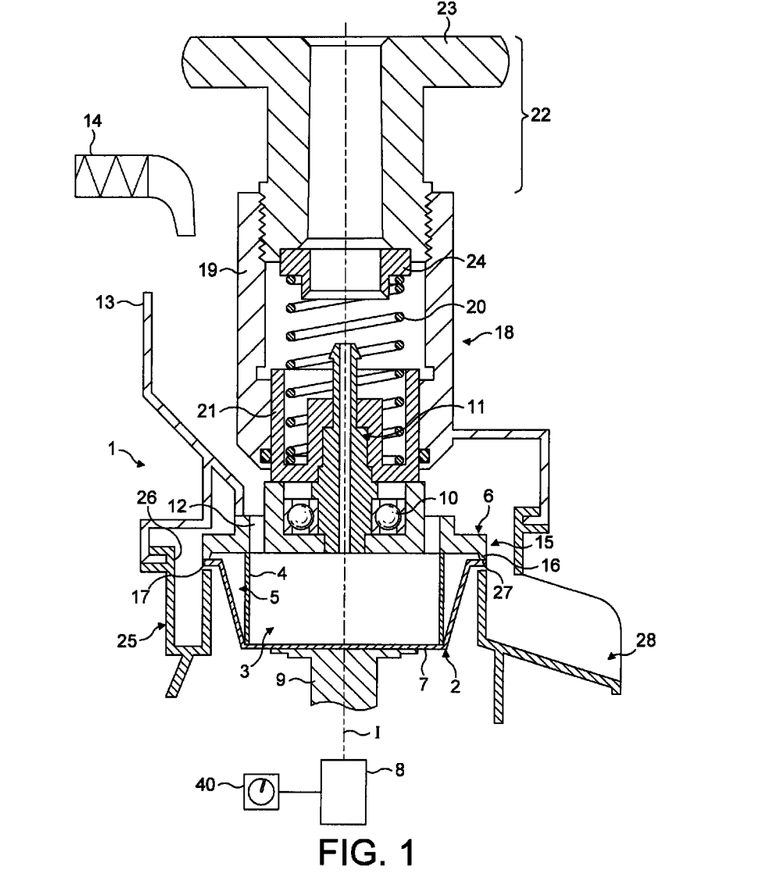
FIG. 1 illustrates a cross-sectional view of an apparatus of the invention according to a first embodiment.

In reference to the apparatus 1 of FIG. 1, a receptacle 2 is provided which comprises a volume 3 for receiving beverage ingredients such as ground coffee and a filter 4 for filtering the liquid extracted from the ingredients and water. The filter can be a cylinder which is fixed in the receptacle 2 to separate the upstream volume containing the ingredients from the downstream volume 5 forming a collecting chamber. The receptacle can be partially closed by a lid 6 which rotates in conjunction with a drum 7 of the receptacle.

The rotation of the receptacle is obtained by centrifugal driving means. In particular, the driving means comprises a motor 8, a rotational coupling 9 and bearing elements 10.

In the central region of the lid 6 is placed a water injector 11 connectable to a source of hot water (not shown). Water can be fed to the injector 11 from a water reservoir and a heater (e.g., thermoblock).

The lid further comprises one or more inlets 12 for feeding the ingredients in the receptacle, i.e., in the internal volume 3. The inlets 12 are in communication with a chute 13 and still above it, a screw-type conveyor 14 for feeding the chute with powder ingredients. Various powder ingredients can be used in the apparatus of the invention, even if the preferred ingredients comprise roast and ground coffee.

The apparatus of FIG. 1 further comprises a valve mechanism 15 for providing an annular flow passage as a response to the forces of centrifugation of the liquid forcing the valve to open. For this, the lid 6 extends by a pressing portion 16 onto an upper edge 17 of the cup or drum 7 of the receptacle. The pressing portion exerts a closing force onto the edge under a certain load obtained by a spring-biasing means 18.

The spring-biasing means 18 can take various configurations. In the illustrated one, the means 18 comprises a cartridge formed by a tubular body 19 into which is inserted a spring 20 which acts in compression against a socket 21. The socket thus transmits the load to the lid 6.

The spring-biasing means of the valve means can be adjustable to vary the load. The more the spring is compressed, the higher the load on the pressing portion. Therefore, the forces of the liquid to open the valve must be higher. The load adjusting means 23 can be formed of a screw head 22 threaded into the tubular body 19 and which exerts a compression load of adjustable value on the spring 20 such as via a second socket 24.

A liquid collecting assembly 25 is provided around the receptacle which comprises an impact surface 26 at a short distance of the outlet provided between the lid and cup of the receptacle, at the outlet interface 27. The collecting assembly has a duct 28 for guiding the collected liquid to a cup or glass placed below.

Figure 2:
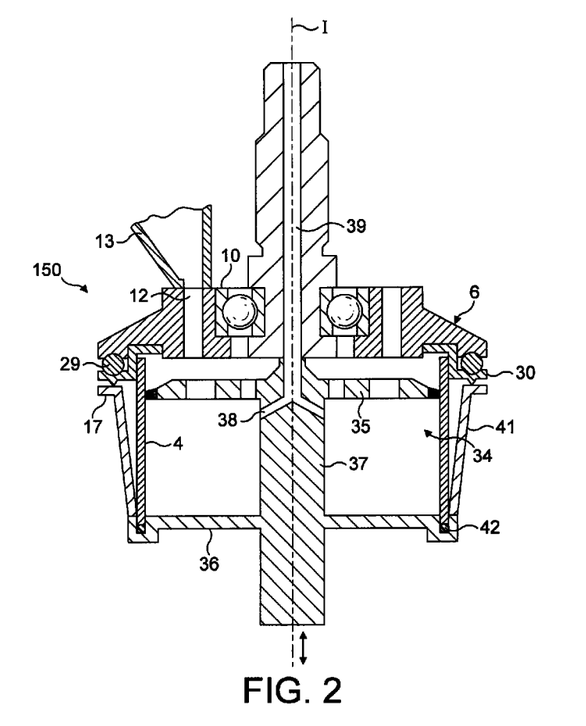
FIG. 2 illustrates a cross-sectional view of an apparatus of the invention according to a first variant.
Figure 3:
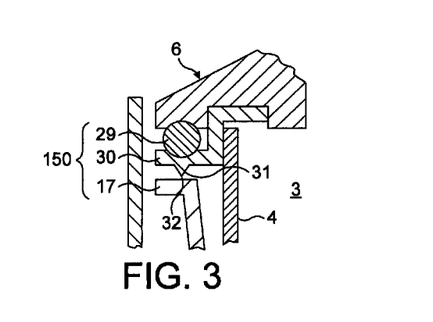
FIG. 3 shows a detail view of the embodiment of FIG. 2.

A second embodiment is illustrated in FIGS. 2 and 3. One difference compared to the previous embodiment is that the valve 150 has a rubber elastic loading member 29. The valve means 150 more specifically comprises a lid 6 comprising a pressing insert 30 which acts in closure with the upper edge 17 of the receptacle. The insert may comprise a annular pointed edge 31 which seals against the edge when no pressure or an insufficient pressure of liquid is exerted at the inner surface of the edge. When the pressure of liquid exceeds a certain threshold, the inserts 30 is forced by the liquid to compress the rubber elastic ring 29, thereby creating a flow gap 32 between the edges 31, 32. The threshold of pressure is adjusted so that the residence time is sufficient in the receptacle for enabling interaction between the liquid and the ingredients, e.g., coffee, and/or a nice crema can be obtained on top of the beverage. The threshold of pressure can be lowered to reduce interaction and/or reduce the amount of foam. Preferably, a speed varying means provides different speeds as a function of the beverage to produce. The speed varying means can be a controller 40 that controls the speed of the rotational driving means, e.g., the rotary motor driving the receptacle in rotation (FIG. 1). As known per se, the rotational speed also influences the pressure in the receptacle and so the residence time of liquid. Therefore, the residence time is preferably controlled by both adjusting the cross section of the beverage flow and the rotational speed. As a result the quality of the beverage (concentration, aroma, etc.) can be varied.

The filter 4 placed inside the receptacle ensures that only the centrifuged liquid can pass through the gap 32 whereas coffee solids are retained in the upstream volume 3 of the receptacle. For this the openings or pores of the filter 4 are preferably sized at least below the mean diameter of the coffee particles, e.g., below 500 microns, more preferably below 300 microns, most preferably below 200 microns. The opening surface area of the filter is such that it provides a pressure loss lower than or substantially equal to the pressure loss created at the beverage flow gap.

The apparatus of FIGS. 2 and 3 also has an openable receptacle which facilitates cleaning and removal of the used ingredients. In particular, it comprises a scraping arrangement 34. The scraping arrangement has a disc-shaped scraper 35 (such as comprising a terminal brush) which is moveable axially relative to the central axis of rotation I of the receptacle. The scraper can so move down to scrape the inner surface of the filter 4 and remove the used ingredients which have adhered to the filter screen. The scraper can be integral with the bottom portion 36 of the receptacle via a central shaft 37. Therefore, when the scraper is moved down, the bottom portion opens the receptacle at the same time to allow used ingredients to be removed from the receptacle. An air blower (not shown) can be further associated to remove the coffee particles from the inner surfaces of the receptacle. The shaft may further comprise injection openings or conduits 38 enabling water to be directed in the receptacle along a substantially radial flow path. The shaft can be designed to seal against the water outlet 39 so that water is properly guided from the injector to the injecting openings or conduits. In the bottom of the receptacle, a sealing means 42 can be provided to seal against the conically widening sidewall 41 of the receptacle.

As a possible variation of the described embodiments, the valve can be replaced by a series of outlets of variable cross section distributed along the upper edge of the receptacle. It would suffice that the pressing surfaces 16, 17 of the receptacle comprise an apertured structure or a diaphragm. The outlets can vary in size by effect of the centrifuged liquid exerting a pressure on the pressing portion of the valve. At the start, the outlets can be very small and their cross section can increase progressively when the pressure of liquid increases at the inner side of the valve. The variation of the outlets can also be carried out by mechanical actuation such as by a piston, a cam or any suitable equivalent device; which actuation is controlled by the control unit 40 (FIG. 1).

Of course, the valve can be formed by the upper edge 17 of the cup. For example, the upper edge 17 can also be resilient enough to deflect and create a gap whereas the upper edge of the lid is fixed. Also, both the upper and lower edges 30, 17 can be made deformable to create a beverage flow gap.

The invention will now be described in view of different variants in which the cross section of the flow outlets of the apparatus is made variable by different possible technical means. A man skilled in the art will recognize that many other technical variations can easily be envisaged.

Figure 4:
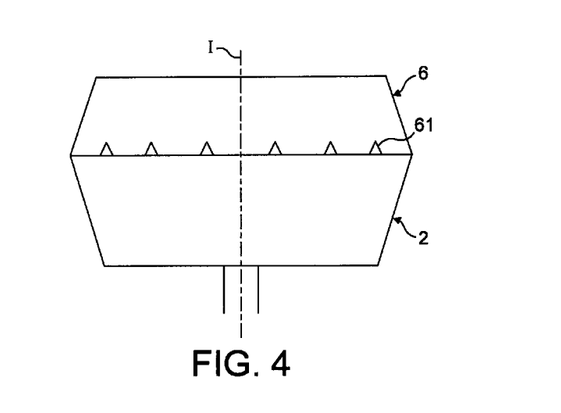
FIG. 4 is a schematic view of a receptacle in a first variant with variable beverage flow outlets in a small opening configuration.
Figure 5:
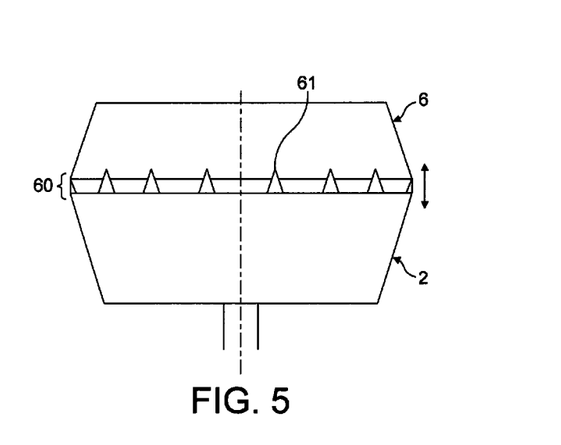
FIG. 5 is a schematic view of the receptacle of FIG. 4 in a larger opening configuration of the beverage flow outlets.

In the variant of FIGS. 4 and 5, a receptacle 2 is provided which is closed by a lid 6 at an overlapping region 60. In this region are provided a series discharge outlets 61 provided either in the lid or receptacle which can be partially covered by the respective overlapping part, i.e., receptacle or lid. The receptacle and lid are adjustable one another along the axial direction I so that the cross section of the outlets can be increased progressively (or stepwise) as the lid and receptacle are moved relatively one another in opposite axial direction. Of course, one of the two elements can be moved while the other is fixed or, alternatively, the two are mobile. In the configuration of FIG. 5, the cross section of the outlets is larger so that the resistance to the flow is significantly decreased. As aforementioned, the variation of the cross section can be provided by an adjustment mechanism of the relative position of the lid and receptacle such as a cam, a lever or a screw, etc. (not illustrated).

Figure 6:
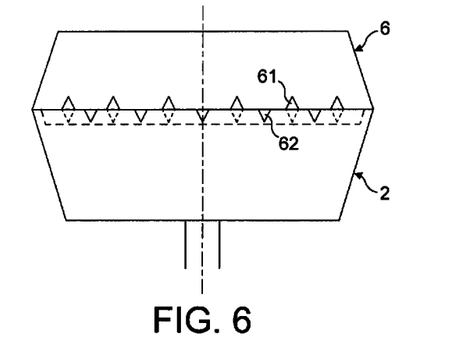
FIG. 6 is a schematic view of a receptacle in a second variant with variable beverage flow outlets in a small opening configuration.
Figure 7:
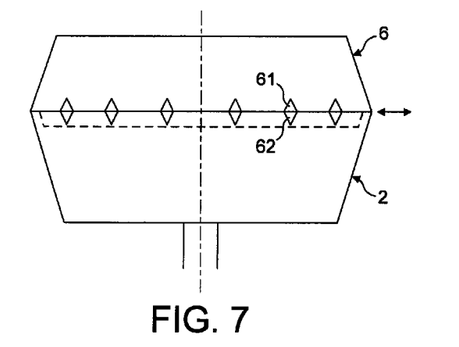
FIG. 7 is a schematic view of the receptacle of FIG. 6 in a larger opening configuration of the beverage flow outlets.

In the variant of FIGS. 6 and 7, the cross section of the beverage discharge outlets is varied by an angular positioning of the lid 6 relative to the receptacle 2. In particular, the lid can comprise a series of outlets 61 which align rotatably with a series of outlets 62 provided in the receptacle; the latter being closed by the lower edge of the lid, in the non-aligned position of FIG. 6 and being opened in the aligned position of FIG. 7. Thus, in the separated position of FIG. 6, only the outlets 61 provide a restrictive passage to the flow whereas in the aligned position of FIG. 7, both outlets 61 and 62 form a larger passage to the flow.

Figure 8:
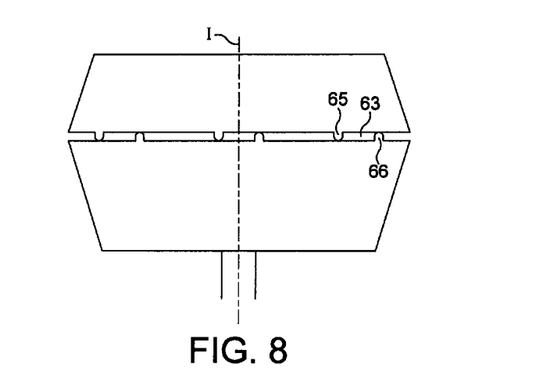
FIG. 8 is a schematic view of a receptacle in a third variant with variable beverage flow outlets in a small opening configuration.
Figure 9:
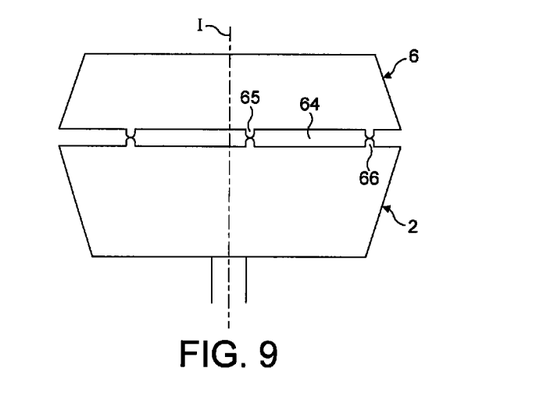
FIG. 9 is a schematic view of the receptacle of FIG. 8 in a larger opening configuration of the beverage flow outlets.

In the variant of FIG. 8, the cross section of the beverage discharge outlets 63 is varied by the relative engagement/disengagement of protruding portions 65 of the lid and protruding portions 66 of the receptacle. In the configuration of FIG. 8, the protruding portions 65 of the lid are misaligned relative to the protruding portions 66 of the receptacle thereby leaving a smaller discharge gap 63 between them. In the configuration of FIG. 9, the portions 65, 66 are aligned radially thereby creating a larger discharge gap 64. The change of position can be carried out by a relative angular displacement of the lid and receptacle.

Figure 10:
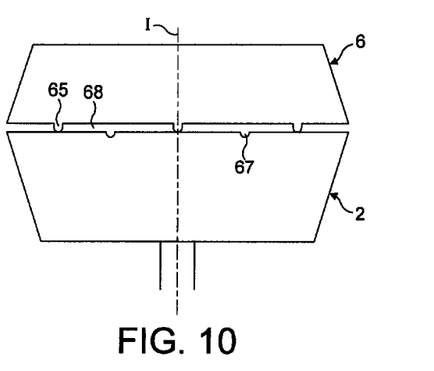
FIG. 10 is a schematic view of a receptacle in a fourth variant with variable beverage flow outlets in a small opening configuration.
Figure 11:
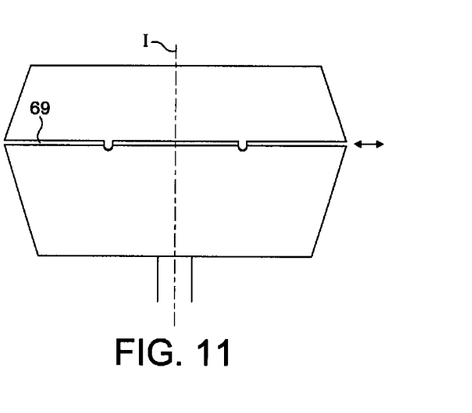
FIG. 11 is a schematic view of the receptacle of FIG. 10 in a larger opening configuration of the beverage flow outlets.

The variant of FIGS. 10 and 11 is similar to the preceding one except that protruding portions 65 of one of the elements, i.e., lid 6, can selectively engage grooves 67 of the second element, e.g., receptacle 2. In FIG. 10, the protruding portions 65 and grooves 67 are misaligned causing the portions 65 to engage an upper edge of the receptacle, so that a larger discharge gap 68 is maintained. The grooves are sized to partially receive the protruding portions thereby leaving a smaller gap 69 in the position of FIG. 11.

Figure 12:
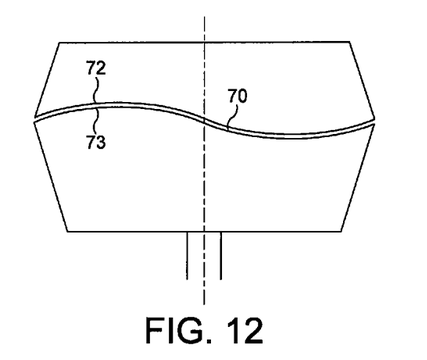
FIG. 12 is a schematic view of a receptacle in a fifth variant with variable beverage flow outlets in a small opening configuration.
Figure 13:
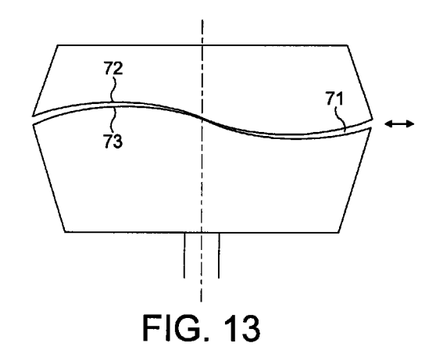
FIG. 13 is a schematic view of the receptacle of FIG. 12 in a larger opening configuration of the beverage flow outlets.

In the variant of FIGS. 12 and 13, the passage of a small discharge gap 70 to a larger discharge gap is provided by a cam means. For instance, the lid and receptacle are formed with cam segments 72, 73 which engage each in a manner to leave a different gap width as a function of their relative angular positioning.

Figure 14:
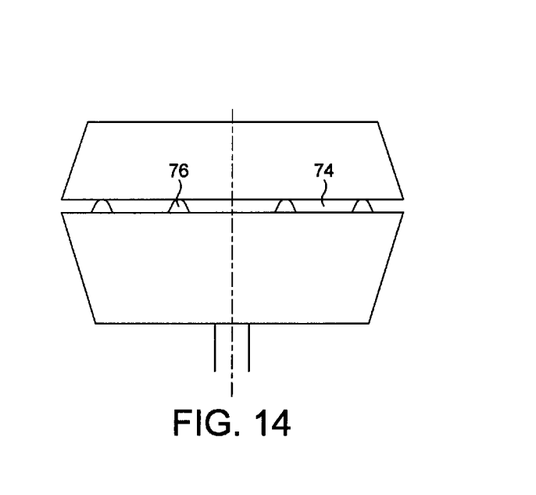
FIG. 14 is a schematic view of a receptacle in a sixth variant with variable beverage flow outlets in a small opening configuration.
Figure 15:
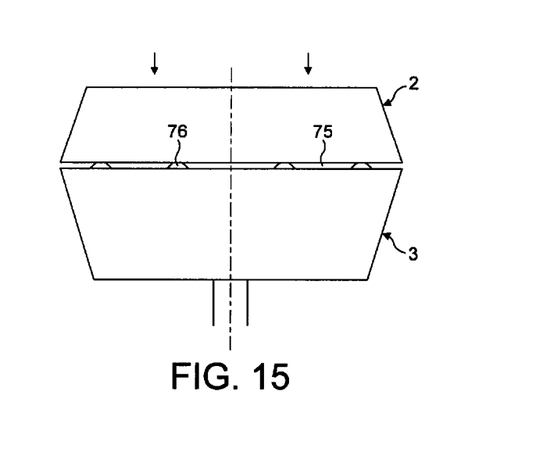
FIG. 15 is a schematic view of the receptacle of FIG. 14 in a larger opening configuration of the beverage flow outlets.

Finally, in the variant of FIGS. 14 and 15, the cross section of the flow gaps 74, 75 can be varied by compressing to a different degree, elastic elements 76 positioned between the lid and receptacle. In the position of FIG. 14, the elastic elements are not compressed or partially compressed thereby leaving a large gap 74. In the position of FIG. 15, the lid and receptacles are approached one another and the elastic elements are more compressed thus forming a smaller gap 75. The compression can be carried out by a piston or a cam mechanism or any suitable actuation means.

What is claimed is:

1. An apparatus for preparing a beverage liquid from beverage ingredients contained in a receptacle by passing water through the beverage ingredients by centrifuging the receptacle comprising:

centrifugation means for driving the receptacle around a central axis of rotation (I) of the receptacle, means for feeding water into the receptacle along the central axis, filtering means placed at the periphery of the receptacle, a liquid collecting assembly for collecting the beverage liquid from the receptacle, a lid having an overlapping region with the body of the receptacle for closing the receptacle, and at least one flow outlet of variable cross-section located between the filtering means and the collecting assembly in the overlapping region of the lid and body of the receptacle, wherein the filtering means comprises a portion of a filter placed in the receptacle between an upstream volume of the receptacle for the placement of beverage ingredients and a downstream volume of the receptacle for collecting of the beverage liquid before it is released to the at least one flow outlet, and wherein, when the receptacle is driven, water fed into the receptacle is urged by centrifugation forces to pass through the beverage ingredients in the receptacle to form the beverage liquid, and the beverage liquid is filtered through the filtering means before being discharged out of the receptacle from the at least one flow outlet and collected by the liquid collecting assembly.

2. The apparatus according to claim 1, wherein the at least one flow outlet comprises an openable flow restriction valve.

3. The apparatus according to claim 1, wherein the cross section of the at least one flow outlet varies to create a flow path during centrifugation.

4. The apparatus according to claim 1, wherein the at least one outlet for the beverage flow has a cross section which increases during the centrifugation.

5. The apparatus according to claim 4, wherein the at least one beverage outlet increases as a result of the centrifugal forces.

6. The apparatus according to claim 4, wherein the filtering means comprises a cylindrical portion of a filter or screen.

7. The apparatus according to claim 4, which further comprises a collecting volume positioned between the filtering means and the at least one outlet.

8. The apparatus according to claim 4, which further comprises means for varying the rotational speed of the centrifugation means.

9. The apparatus according to claim 4, wherein the centrifugation means is a centrifugal driver, the water feeding means is a water injector, and the filtering means is a filter located within the receptacle.

10. The apparatus according to claim 4, which further comprises a valve associated with the outlet with the valve opening when subjected to centrifugal forces.

11. The apparatus according to claim 10, wherein the valve comprises a resilient loading member.

12. The apparatus according to claim 11, which the resilient loading member is a resilient plastic, rubber elastic or a mechanical spring.

13. The apparatus according to claim 11, wherein the loading member provides an adjustable load on the valve.

14. The apparatus according to claim 1, wherein the at least one flow outlet comprises a series of beverage outlets provided at the periphery of the receptacle.

15. The apparatus according to claim 14, which further comprises a valve associated with the outlet with the valve opening when subjected to centrifugal forces, wherein the valve opens from a closed position to an open position by forming an annular gap capable of delivering a 360-degree centrifuged layer of beverage.

16. A method for the preparation of a beverage from the apparatus of claim 1, which comprises:

applying beverage ingredients to a receptacle that includes a filter placed at the periphery of the receptacle, closing the receptacle by the lid at the overlapping region, rotating the receptacle and supplying water into the receptacle along a central axis thereof so that water is forced through the beverage ingredients to form a beverage liquid, extracting the beverage liquid through the filter, and passing the flow of beverage downstream of the filter to at least one outlet to dispense the beverage.

17. The method of claim 16 wherein the beverage ingredients form a coffee beverage.

18. The method of claim 16, wherein the at least one outlet is an openable outlet which opens due to the force of the liquid beverage.

19. A method for the preparation of a beverage from the apparatus of claim 1, which comprises:

rotating the receptacle and supplying water into the receptacle along a central axis thereof so that water is urged by centrifugation forces to pass through the beverage ingredients in the receptacle to form the beverage liquid;

filtering the beverage liquid is through the filtering means; and discharging the filtered beverage liquid to at least one flow outlet to dispense the beverage.

20. The method of claim 19 wherein the beverage ingredients form a coffee beverage.

21. The method of claim 19, wherein the at least one outlet is an openable outlet which opens due to the force of the liquid beverage.

* * * * *